Figure 1:
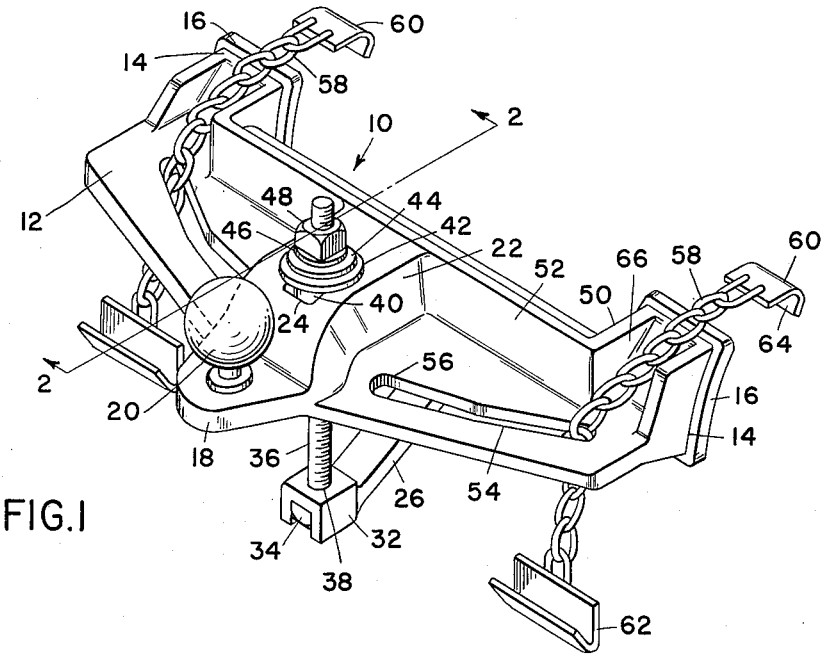

Dec. 19, 1961  J. PUCCIO  3,013,817
TOWING BUMPER HITCH
Filed March 7, 1960

INVENTOR.
JOSEPH PUCCIO
BY
Cumpston & Shaw
his attorneys.

3,013,817
TOWING BUMPER HITCH

Joseph Puccio, Rochester, N.Y., assignor, by mesne assignments, to Charles H. White, Rochester, N.Y.
Filed Mar. 7, 1960, Ser. No. 13,004
1 Claim. (Cl. 280—502)

This invention relates to towing bumper hitches for towing one vehicle by another, one object being to provide an improved hitch of the above character having a more adaptable, rugged and efficient construction.

Another object is the provision of such a hitch having a more adaptable and durable clamping means for attachment to a bumper.

A further object is to supply a hitch having clamping means of the above nature provided with an improved towing bar of substantial length for distributing the stresses imposed upon the bumper.

Still a further object is the provision of a hitch having the above advantages in a construction capable of being readily and economically manufactured and convenient to apply to a wide variety of conditions.

To these and other ends the invention resides in certain improvements and combinations of parts, all as will be hereinafter more fully described, the novel features being pointed out in the claim at the end of the specification.

Figure 2:
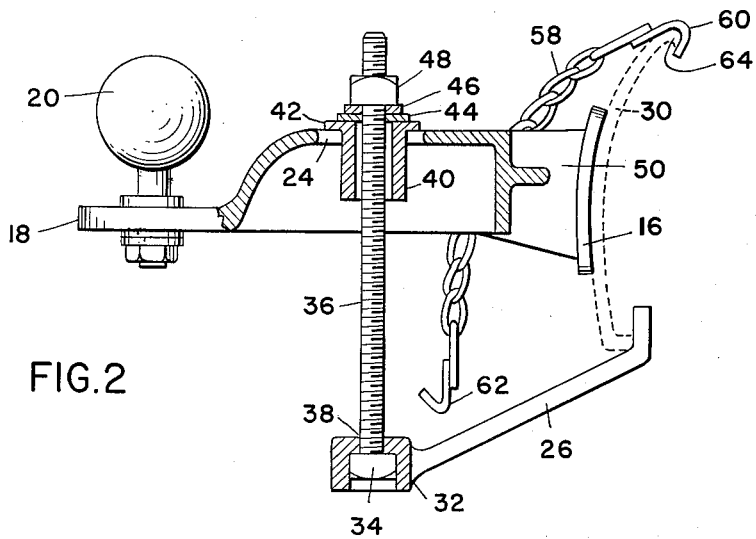

In the drawings:

FIG. 1 is a perspective view of a bumper hitch embodying the present invention, and FIG. 2 is a sectional view on the line 2—2 in FIG. 1.

The embodiment of the invention herein disclosed by way of illustration, preferably comprises a clamp bracket, indicated generally at 10, having a substantially horizontal plate portion 12 provided at each end with an upstanding bearing part or flange 14 provided with a wear-resisting pad 16, for engagement with an outer face of the bumper. Plate portion 12 is provided at its other side with an extension 18 having means for connection with a towing vehicle, such as an opening for the reception of a king pin 20. Plate portion 12 is formed centrally with an elevated platform 22 having formed therethrough an opening 24. The side walls of platform 22 are inclined downwardly and outwardly, as shown, for purposes hereafter described.

Bracket 10 has also a hook portion 26 formed with a hook-shaped end for engagement with the lower edge of a bumper 30. The hook portion 26 has a channel-shaped end 32 for engagement with the squared head 34 of a threaded bolt 36 which extends upwardly through an opening 38 in the top of the channel-shaped portion 32. Bolt 36 extends upwardly and loosely through opening 24 in platform 22. A cylindrical bushing 40 slidably surrounds the portion of the bolt passing through the platform opening and has at its upper end a flange 42 resting on the platform to support the bushing in the opening. The bolt is provided above flange 42 with a washer 44 and a lock washer 46 and a nut 48 supporting the bolt in the bushing and the bushing on the platform. By turning nut 48 the hook portion 26 is raised to grip the lower edge of the bumper. It will be seen (FIG. 2) that bolt 36 and its bushing are spaced from the inclined sides of the platform to allow the bolt to have some rocking movement on the platform to adjust the hook portion 26 and its hook-shaped end 28 to the bumper. The bushing serves to enclose and protect the threaded portion of the bolt from marring or stripping the threads by contact with the sides of the platform opening during any swinging of the bolt and its hook portion 26 in adjustment to the bumper or by towing vibrations.

Plate portion 12 of the bracket is elongated or spread lengthwise of the bumper, as shown, to distribute the applied stresses lengthwise of the bumper, each end having an extension 50 carrying one of the bumper pads 16 described above. A flange 52 is provided on the plate portion and connects the extensions 50 to strongly reinforce the parts and provide an extremely rugged construction.

The plate portion 12 is formed on each side of its platform 22 with an elongated slot 54 extending obliquely to the line of the bearing extensions 50, as shown. Slots 54 have narrow outer ends with a width of, say, ⅜ of an inch, and preferably have their inner ends somewhat enlarged as at 56, to readily permit insertion therethrough of a link chain 58 with end hooks 60 and 62 for engagement alternately with the upper edge of the bumper. The chain is adjusted through slot 54, as by twisting its links, until the upper hook tightly engages the bumper, after which the links are locked in engagement with the narrow end of the slot. Nut 48 is then turned to raise hook portion 26 to raise its hook-shaped end 28 and securely grip the bumper between its end 28 and the upper chain hook, thereby tightly clamping the bracket to the bumper. Chain 58 is provided at one end with a hook, as 60, of minimum length, say, one and one-half inches, and a wider throat 64, of say, one inch, opening for engagement with a bumper having a relatively wide and rigid upper edge, while the hook 62 on the other end of the same chain is preferably of greater length, say, 3 inches, and a narrow throat, say, ½ inch wide, for a more extended and rigid engagement with a bumper having a thin edge, thus adapting the hitch to securely fit bumpers of different constructions. The chain hooks are readily passed through the wider end of slot 54 and the integral attachment of the hooks to the ends of each chain obviate the use of hooks detachable from the chain and the likelihood of inadvertent detachment in use or loss of the same.

The bearing extensions 50 of plate portion 12 are preferably recessed as at 66 to loosely retain the chains 58 and provide some adjustment of the hooks longitudinally of the bumper.

It is apparent from the above construction that the invention provides a towing hitch of rigid construction adapted for attachment to a bumper at two widely spaced points so as to distribute the stresses on the bumper and the likelihood of its distortion. The attaching chains 58 are provided integrally with end hooks of varying size to fit different bumpers; the chains are readily adjustable in the slots 54 of the platform portion and the outward and forward inclinations of the slots serves to pull and maintain the chains in the constricted outer ends of the slots so as to insure against the loosening of the chains by jolting motions of the vehicles. The invention thus provides a towing hitch of exceptionally rugged construction, with readily adaptability to varying conditions and reliable performance in use and in a simple type of construction having relatively few parts capable of being readily manufactured and conveniently applied for use.

This application claims subject matter disclosed but not claimed in applicant's copending application, Serial No. 735,494, filed May 15, 1958, now Patent No. 2,938,-729, May 31, 1960.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the consruction and arrangement of the parts will readily occur to those skilled in the art, within the spirit of the invention and the scope of the appended claim.

I claim:

A towing bumper hitch comprising a brake having a substantially horizontal, elongated plate portion provided at its ends with upstanding bearing parts for engagement with the face of a bumper, a pair of upstanding spaced flanges on said plate portion normal to and supporting each of said bearing parts, said plate portion being provided between said bearing parts with an extension formed with an opening for reception of a king pin for connection with a towed vehicle, an elevated platform on said plate portion having an opening therethrough, an upstanding flange on said plate portion connecting said platform and the inner flanges of said bearing parts, an integral hook below said plate portion for engagement with the lower edge of a bumper and having a threaded bolt extending loosely upwardly through said platform opening, a bushing sleeve extending loosely through said platform opening with a flange at its upper end resting on said platform to maintain said bushing sleeve therein, said bolt being enclosed in said bushing sleeve and protected thereby against injury of its threads by contact with said platform, nut means on said bolt and bearing against said bushing flange to clamp said hook portion against said bumper, said plate portion being formed on opposite sides of said platform with elongated narrow slots extending from points opposite said pairs of flanges respectively and obliquely to the line of said bearing parts and having inner ends of enlarged width, and link chains extending through said slots, respectively, for adjustable interlocking engagement of the links thereof with the sides of said slots, each of said chains extending between the flanges of one of said pairs of flanges and having its ends provided with elongated hook portions adapted to be removably passed through the enlarged ends of said elongated slot, one of said hooks of each chain having a greater length and narrower throat than the other hook thereof for selective engagement of said hooks with bumpers of different dimensions.

References Cited in the file of this patent
UNITED STATES PATENTS

| | | |
|---|---|---|
| 2,542,907 | Dayton et al. | Feb. 20, 1951 |
| 2,772,099 | Smith | Nov. 27, 1956 |
| 2,791,445 | Wanamaker | May 7, 1957 |
| 2,814,506 | Croft | Nov. 26, 1957 |
| 2,884,260 | Polstra | Apr. 28, 1959 |